Patented Sept. 2, 1947

2,426,788

UNITED STATES PATENT OFFICE 2,426,788

PRODUCTION OF RUTILE TITANIUM DIOXIDE

David B. Pall, New York, N. Y., assignor, by mesne assignments, to American Cyanamid Company, a corporation of Maine No Drawing. Application June 11, 1941, Serial No. 397,549

2 Claims. (Cl. 23—202)

This invention relates to the preparation of titanium dioxide pigment in rutile crystal form, and has particular reference to new and novel methods for preparing such a pigment from aqueous titanium tetrachloride solutions which produce pigments whose tinting strength and hiding power are considerably higher than those produced by previously known methods.

Titanium dioxide is a white pigment with the highest hiding power and tinting strength of any of the known pigments. It has largely been prepared in the past in the form of very fine particles, crystallized in the form of the mineral anatase; this form is made by the hydrolysis of titanium sulfate solutions largely obtained from the mineral ilmenite, followed by calcination of the hydrolysate to produce the pigment.

The anatase form of titanium dioxide has the objectionable feature of chalking very badly in exterior coating compositions, and it has been proposed to replace the anatase crystal form of pigment by the rutile form, which is obtained by calcining the hydrolysates of titanium tetrachloride and titanium tetrafluoride solutions. This form is known to have a higher index of refraction than the anatase form, and thus yields an extra money value in pigment properties, as well as being superior in the reduction of chalking tendency.

The principal reason for the failure of the art to produce rutile pigment commercially has been the higher cost involved in the production of this pigment; this additional cost has not been compensated for by the 25% higher tinting strength and hiding power shown by the rutile pigments, as compared to the better anatase pigments. None of the methods employed (as exemplified by U. S. Patents Nos. 1,189,229, 2,044,753, 2,062,133, 2,062,134, 2,113,945, and 2,113,946 (reissued as Re. 21,693)), gave results which warranted the commercialization of rutile pigments in view of the plant investment in the anatase pigments.

I have discovered that rutile type pigments may be hydrolyzed from titanium tetrachloride solutions, to produce pigments whose color and tint tone are satisfactory as compared with standard commercial anatase pigments, and with tinting strengths of the order of 50% greater than those obtained with the best commercial anatase pigments, by proper control of the hydrolysis. My method involves introducing a titanium tetrachloride solution (preferably containing from 5% to 35% $TiO_2$) into a small volume of hot water (maintained at or near boiling), maintaining the heat of the solution until the titanium content has hydrolyzed and calcining the hydrolysate at conventional temperatures.

I believe that the resultant product is superior to products obtained by the heretofore known methods of producing rutile crystal form titanium dioxide pigment, because the sizes of the ultimate particles of which it is composed are such that a maximum amount of light is reflected by a thin film in which the pigment is dispersed, yielding tinting strengths of the order of 1800 or higher, as compared to about 1240–1280 for the best commercial anatase.

The amount of hot water used, in relation to the amount of titanium dioxide in the titanium tetrachloride solution, is critical for obtaining best results. The amount used should be from 1½ to 6 parts by weight of water per part of titanium dioxide to be hydrolyzed. Above or below this figure, there is a noticeable dropping off in pigment value. The preferred range is from 2.2 to 5.0 parts of water per part of titanium dioxide.

The water to which the titanium chloride solution is added should be maintained at or near the boiling point during the course of the addition of the tetrachloride solution. The tetrachloride solution is introduced at a substantially lower temperature (preferably at or below room temperature, up to about 60° C.), to avoid the harmful effect on pigment properties obtained when the chloride solution is heated higher. Hence, the time of addition must be sufficiently slow so that there is no substantial cooling of the mixture. I have successfully obtained a proper admixture in from about two minutes to about two hours; but I prefer to use as short a time as is convenient considering the amount of heat input available to maintain boiling conditions, preferably under one hour.

After the titanium tetrachloride has been added to the hot water, boiling is continued from 10 to 30 minutes to complete the hydrolysis; the precipitate obtained is filtered, washed and calcined at ordinary temperatures (800–1000° C.) with the addition of the conventional calcination agents. A typical desirable agent comprises 0.6% of $K_2CO_3$, which is added to the filter cake just before drying and calcination.

Typical examples of my invention are the following:

Example 1

A basic titanium tetrachloride solution was prepared containing 14.6% $TiO_2$, and having a ratio of titanium to chlorine ions of 1 to 2.7. A portion of such a solution containing 2 parts by weight of TiO₂ was added, at room temperature, over a period of 14 minutes to 9.4 parts by weight of water maintained at boiling. Heat was maintained for 30 minutes to complete hydrolysis. The product was filtered, and the cake stirred with 0.012 parts by weight of $K_2CO_3$ in water, dried and calcined at 900° C. for 2½ hours. A product having a tinting strength of 1850 was obtained. The product had a reflectance equal to 99% of standard magnesium oxide, and was soft and of excellent texture.

Tinting strength was determined by the method recommended in A. S. T. M. designation D-34-39. The pigment was mulled into a white ink with a refined linseed oil. To another ink prepared from a standard pigment, a standard amount of specially prepared black ink is added. Black ink is now added to the ink prepared from the test specimen, until its reflectance is equal to that of the standard mixture. Reflectances are determined spectrophotometrically, after drawing down the inks on a recessed metal plate. The tinting strengths are proportional to the amounts of black ink employed, to attain equal reflectance. The standard is assigned a tinting strength on a scale on which white lead is 100. On this scale, present commercial anatase pigments have a tinting strength of 1240 to 1280, while the product of Example 1 has a tinting strength of 1850.

When two inks such as those referred to above are drawn down side by side, after being adjusted to the same brightness, a difference in purity is often very evident. It is desirable that a pigment should show as great a purity as possible. High purity is referred to as a "blue tint-tone" by those familiar with the art. Pigments having a very "yellow tint-tone," or low purity, are not as valuable for pigment purposes. The product of Example 1 shows a tint-tone about equal to present commercially produced anatase pigments.

When the process of Example 1 was repeated, reducing the water to which the chloride is added to only 2 parts by weight, the final product had a tinting strength of only 1400. When 4 parts of water were employed, the tinting strength rose to above 1800. At 12 parts the tinting strength was down somewhat (to 1720), but was still considerably better than most rutile pigments produced according to prior art disclosures. As the amount of water increases, above a ratio of 6 parts of water to 1 part of TiO₂, the tinting strength goes down for a time, and then up slightly; however, the tint-tone becomes increasingly yellow very rapidly, so that satisfactory color is unobtainable.

Example 2

A part of the hydrolysate of Example 1, after drying with potassium carbonate, was calcined at 900° C. for a slightly shorter time than employed in Example 1. The resulting pigment has a tinting strength of 1820, with a very satisfactory tint-tone, when compared with present commercial anatase pigments.

Example 3

Basic titanium chloride solution such as is employed in Example 1, containing 2 parts by weight of TiO₂, was added, at room temperature, over a period of 12 minutes, to 7 parts of water, which was maintained at the boiling point throughout the addition. The mixture was maintained at the boiling point for ½ hour after the addition was complete, and was then filtered, and the cake slurried with 0.012 part of $K_2CO_3$, dissolved in water, dried and calcined at 900° C. for 4 hours.

The product has a tinting strength of 1880, a good color, and a soft and excellent texture.

Example 4

A titanium tetrachloride solution was prepared containing 10.15% TiO₂, and having a ratio of titanium to chlorine ions of 1:4. A portion of such a solution containing 2 parts by weight of TiO₂ was added at room temperature, over a period of 19 minutes, to 10 parts by weight of water maintained at boiling. Heat was maintained for 30 minutes to complete hydrolysis. The product was filtered, and the cake stirred with .012 part by weight of $K_2CO_3$ dissolved in water, dried and calcined at 900° C. The product had a tinting strength of 1820, and was satisfactory in tint-tone. Its color and other pigment properties were excellent.

Example 5

A titanium chloride solution was prepared containing 13.1% TiO₂, and having a ratio of titanium to chlorine of 1:3.24. A portion of such a solution containing 2 parts by weight of TiO₂ was added at room temperature, over a period of 10 minutes, to 9.4 parts of water maintained at boiling. The mixture was maintained at the boiling point for 1 hour to complete hydrolysis. The product was filtered and dried with $K_2CO_3$ as is customary in the art. On calcination for an appropriate length of time at 900° C., the product had a tinting strength of 1800, and showed desirable pigment properties in all respects.

It has been previously supposed, as for example in U. S. Patent No. 2,113,946, that when titanium chloride is added to water, the product is filterable only with great difficulty. For this reason it has been proposed to use flocculating agents to increase the flocculation and hence the filterability. The process here proposed produces a slurry which is readily filterable. When very large quantities of water are used to effect hydrolysis, as disclosed in U. S. Patent No. 2,113,946, the filtration becomes very slow, and coagulating agents become necessary to obtain good filtration. Thus, an additional economy results from the use of my process, for the expense of the coagulating agent is avoided.

Contrasted with the extremely high tinting strengths obtained when the conditions specified above are observed, the products of previously disclosed procedures having satisfactory tint-tones, have tinting strengths of about 1400 to not more than 1600 or 1700.

While I have described only a few examples of my invention, it is applicable in general to titanium tetrachloride solutions, both basic and acidic, over the range of concentrations indicated. Obviously, where iron is likewise present in the solution, the iron and some of the titanium should be reduced to prevent iron precipitation, in a manner well known to the art. The solutions may be prepared as desired, as by precipitation of a sulfate solution with barium chloride, or by solution of liquid titanium tetrachloride in cold water, or by solution of hydrous titanium dioxide in hydrochloric acid.

I claim:

1. The method of producing a rutile pigment of good tint-tone and high tinting strength which comprises preparing a titanium tetrachloride solution containing from 5% to 35% titanium calculated as titanium dioxide, introducing said solution, maintained at a temperature of not above 60° C., into a body of water maintained near the boiling point and weighing from 1½ to 6 times as much as the titanium calculated as titanium dioxide contained in the tetrachloride solution, over a period of time from about 2 minutes to about 2 hours, continuing the boiling of the mixture until the titanium has precipitated, and calcining the recovered precipitate.

2. The method of producing a rutile pigment of good tint-tone and high tinting strength which comprises preparing a titanium tetrachloride solution containing from 5% to 35% titanium calculated as titanium dioxide, introducing said solution, maintained at a temperature of not above 60° C., into a body of water maintained near the boiling point and weighing from 2.2 to 5.0 as much as the titanium calculated as titanium dioxide contained in the tetrachloride solution, over a period of time from about 2 minutes to about 1 hour, continuing the boiling of the mixture until the titanium has precipitated, and calcining the recovered precipitate.

DAVID B. PALL.

REFERENCES CITED

The following references are of record in the file of this patent:

UNITED STATES PATENTS

| Number | Name | Date |
| --- | --- | --- |
| Re. 21,693 | Plechner et al. | Jan. 14, 1941 |
| 2,062,134 | Kubelka | Nov. 24, 1936 |
| 1,967,235 | Ferkel | July 24, 1934 |
| 1,189,229 | Barton | July 4, 1916 |
| Re. 18,854 | Blumenfeld | May 30, 1933 |
| 1,354,940 | Bachman | Oct. 5, 1920 |
| 1,348,129 | Goldschmidt | July 27, 1920 |
| 2,285,104 | Young | June 2, 1942 |

OTHER REFERENCES

Mellor, "A Comprehensive Treatise on Inorganic and Theoretical Chemistry," 1927, Longmans, Green & Co., New York, vol. VII, p. 40.